Sept. 29, 1925.   
L. W. V. WILMS  
1,555,540
SHIFTABLE CLOSING MEANS FOR AUTOMOBILES
Filed Oct. 18, 1923  
2 Sheets-Sheet 1
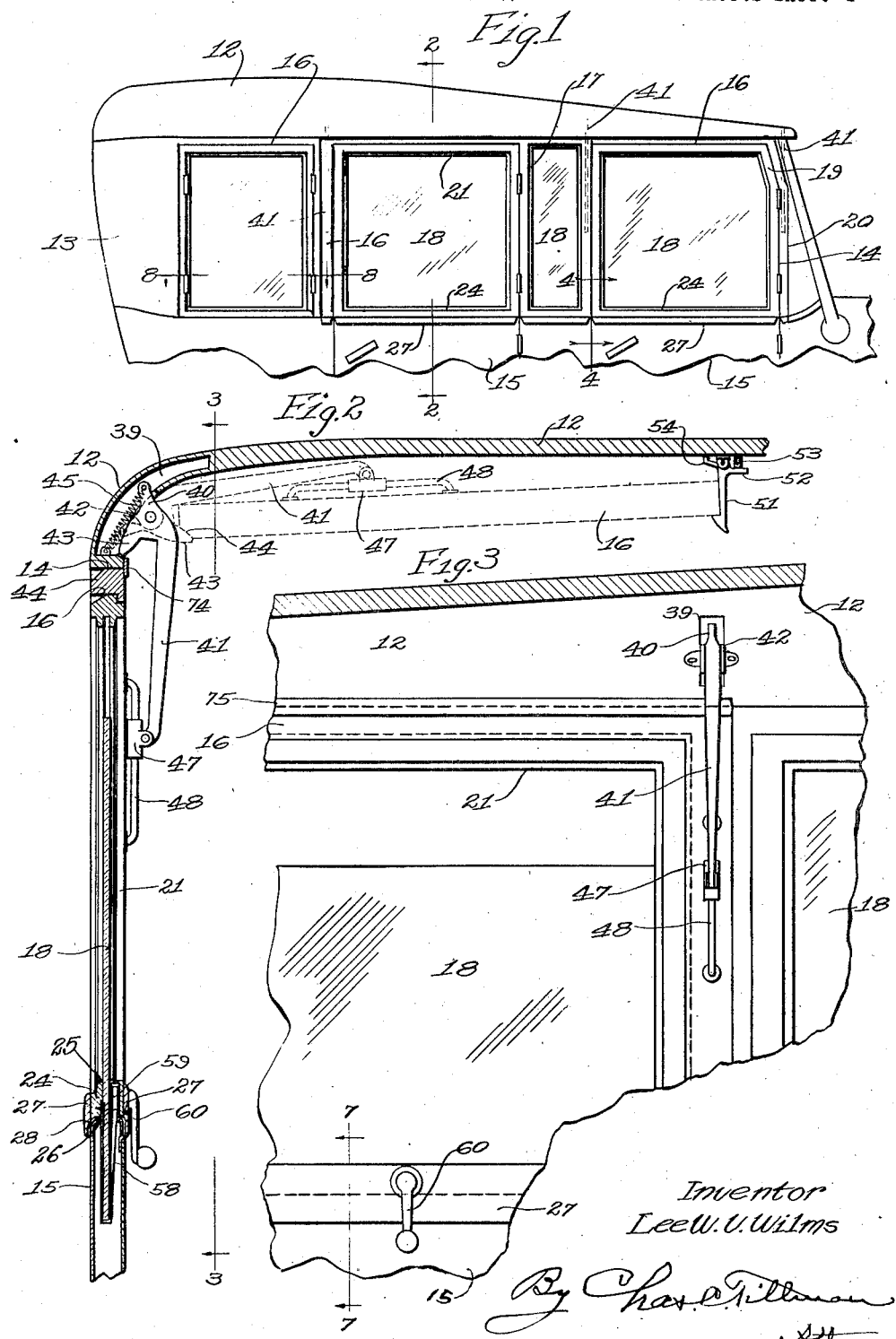
Inventor  
Lee W. V. Wilms

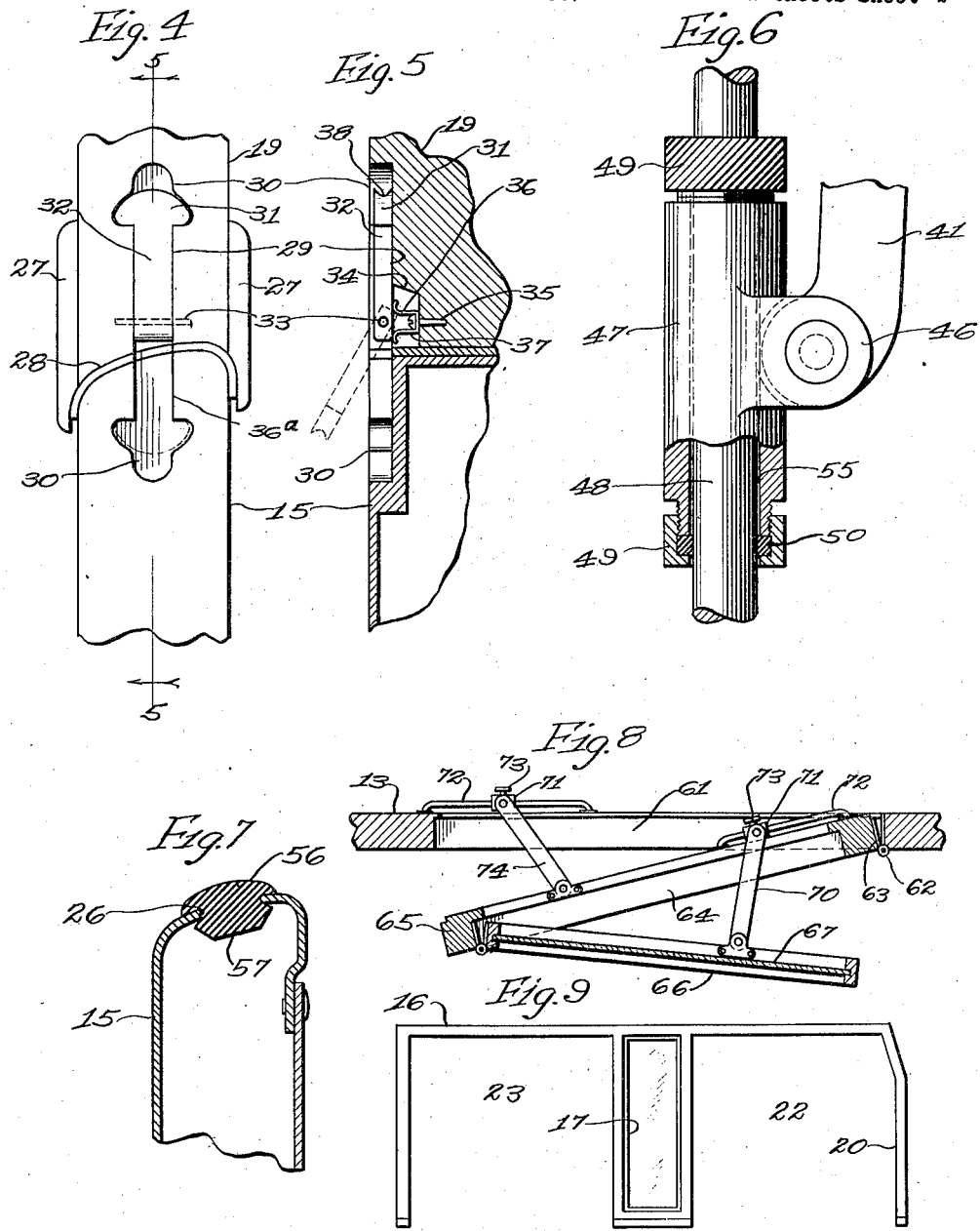

Patented Sept. 29, 1925.

1,555,540

UNITED STATES PATENT OFFICE.

LEE W. V. WILMS, OF CHICAGO, ILLINOIS.

SHIFTABLE CLOSING MEANS FOR AUTOMOBILES.

Application filed October 18, 1923. Serial No. 669,196.

*To all whom it may concern:*

Be it known that I, LEE W. V. WILMS, a citizen of the United States, resident of Chicago, county of Cook and State of Illinois, have invented certain new and useful Improvements in Shiftable Closing Means for Automobiles, described and claimed in the annexed specification.

This invention relates generally to automobiles, but particularly to that type thereof having permanent or fixed tops, and is directed especially to novel and improved means or mechanism whereby a vehicle top may be readily and effectively converted from a closed to an open one, or vice versa, or more definitely speaking, whereby the walls of a vehicle top may be closed against the elements, or easily opened to afford unobstructed vision, ventilation and comfort to the occupants of the vehicle.

The invention is applicable to various types of vehicle or automobile tops without a departure from the spirit of the invention, and while I have illustrated it in the accompanying drawing embodied in a well known type of automobiles, yet I wish it to be understood that such illustration and the following description and explanation is by way of an example only, and that I do not limit myself in the application or use of the invention to any particular type of vehicle or top therefor, but may employ it wherever it may be found applicable or desirable.

The primary or principal object of the invention, is, the provision of means for converting an open top of an automobile into a closed body, or vice versa.

Another object is to furnish a vehicle or automobile top with shiftable closing panels or frames for openings in the walls of the body of the vehicle and so movably mount them that a plurality of such frames or panels can be manipulated as a unit, and positioned vertically and so maintained, to form a closure for the major and front part of each side of the body of the top, or as a unit, can be operated, raised and positioned close to the lower surface of the top or canopy, in which position they will be automatically locked and securely maintained, yet, in such a way that they can be readily released and shifted to their upright or closing position.

Still another object, is, the provision in the rear portion of each side of the body of the top with a laterally shiftable closing panel or frame for an opening in each of said sides, of such construction and arrangement as to permit its parts to be positioned for ventilating drafts of air from the front or rear thereof.

A further object is to provide means to prevent rattling of parts of the mechanism and thereby eliminating noise.

A still further object is to provide means in the unitary operable panels or frames whereby ventilation may be afforded near the upper ends of some of such frames, while they are positioned vertically.

Other objects and advantages of the invention will become apparent from the following description and explanation, which will be more readily understood when read in conjunction with the accompanying drawings, in which one embodiment of which the invention is susceptible, is disclosed, it being understood that changes and modifications may be resorted to without a departure from the spirit of the appended claims forming a part hereof.

In the drawings,—

Fig. 1 is a view in side elevation of a fragment of an automoblie body equipped with my shiftable closing means therefor showing the panels or sashes of said means in their upright or closed positions.

Fig. 2 is an enlarged sectional view taken on line 2—2 of Fig. 1, looking in the direction indicated by the arrows, but showing the pane of glass of one of the panels positioned for ventilation at the upper portion of said panel, and illustrating by dotted lines the position to which a plurality of panels may be raised as a unit and maintained in such position.

Fig. 3 is an inner fragmental view of the top taken on line 3—3 of Fig. 2 looking in the direction indicated by the arrows.

Fig. 4 is an enlarged view in elevation, taken on line 4—4 of Fig. 1 showing the means for securing one of the hinged panels or frames to one of the doors of the top.

Fig. 5 is a sectional view taken on line 5—5, of Fig. 4.

Fig. 6 is a view partly in elevation and partly in section of a portion of one of the supporting arms and its bracket for one of the unitary frames of the top showing means for slidably connecting said arm to its bracket but so as to prevent rattling.

Fig. 7 is an enlarged vertical sectional view taken on line 7—7 of Fig. 3 of the upper portion of one of the doors of the body of the top showing means for closing the opening in the upper end thereof, when the panel there-above has been moved to an open position.

Fig. 8 is a plan sectional view taken on line 8—8 of Fig. 1 showing one of the laterally shiftable panels or frames in the rear portion of a side of the body, in open position, and Fig. 9 is a detached side view of one of the main or unitary frames of the top.

Like numerals of reference refer to corresponding parts throughout the different views of the drawing.

The reference numeral 12 designates the canopy or top of a vehicle or automobile, which may be supported on the body designated as a whole by the numeral 13 in the usual or any well known manner. Each side of the body 13 is provided in its major and front portion with a horizontally elongated substantially rectangular opening 14, which openings extend from near the lower edges of each side of the top or canopy to a point at the top of the doors 15 of the body. In each of these openings 14 is located a master or main frame designated as a whole by the numeral 16 for a plurality of panels or frames located side by side as is clearly shown in Figs. 1 and 9 of the drawings, the latter view showing the structure of one of said frames but with the panels omitted. As each side of the body of the vehicle or automobile is equipped with devices of similar construction and operation, a description and explanation of the mechanism on one side thereof only will be necessary.

As shown in Figs. 1 and 9, the frame 16 is provided with compartments for three panels located side by side, the intermediate panel 17 being equipped with a pane of glass 18 and permanently or rigidly connected to the frame 16, while the panel 19 at the front end of the frame 16 is hinged at its front upright portion to the front upright portion 20, so as to open forwardly of the vehicle, while the panel 21 at the rear end of the frame 16 is hinged at its front upright portion to the rear upright portion of the fixed panel 17, so as to open forwardly of the vehicle.

The compartments or spaces 22 and 23 of the frame 16 for the panels or frames 19 and 21 respectively, are open at their lower ends as is clearly shown in Fig. 9, for the purpose of permitting the pane of glass 18 which each of said frames or panels has mounted therein for slidable vertical movement to extend downwardly into the cavity of the door located directly beneath each of said panels, when ventilation at the upper part of the master frame 16 is desired. The lower horizontal rail 24 of each of the panels or frames 19 and 21 is provided with a longitudinal slot 25, see Fig. 2, to register with a longitudinal slot 26 in the upper and horizontal end of the door 15 located below the panel, and each of said horizontal rails 24 has secured to each of its sides and longitudinally thereon, strips 27 preferably of metal, which strips depend at their lower edges a sufficient distance to embrace the upper portions of the opposite sides of the door, thereby connecting said sashes to their respective doors in a way to exclude dust, rain, and the like when the panels are in their closed or upright positions, yet so that they can be detached when desired.

The structure just above referred to is clearly shown in Fig. 2, by reference to which view it will be seen that the upper portion of each door has mounted thereon a strip 28 of felt, rubber or the like to afford a cushion seat or rest for the panel above said door, which strip is provided with a longitudinal slit to co-incide with the slot in the lower rail of the panel or frame so that the pane of glass can slide through the same. This arrangement is also disclosed in Fig. 4, in which view means for locking the panel located above each door to the door, is shown. This locking means consists in providing the upright rail of each panel or frame 19 and 21 opposite its hinged upright rail or portion, in its face, at its lower end, with a vertical slot 29, which slot has an enlargement 30 at its upper end to receive a head 31 on a locking arm 32, which is mounted at its lower end on a transverse pivot 33 secured in the sides of the slot 29. At its lower end the slot 29 is provided with a recess or deepened portion 34, in which is located and secured by means of a screw 35 or otherwise, a spring comprising a pair of arms 36 and 37 extended outwardly to cooperate with the arm 32 for holding it in its closed positions. The corresponding edge or face of the door 15 under the panel or frame, is provided with a slot 36$^a$ of the same construction as the slot 29, except that the deepened portion 34 is omitted. This slot 36$^a$ is in alignment with the slot 29 so that by turning the arm 32 downwardly on its pivot, the head 31 of said arm will engage the enlarged portion of the slot 36$^a$ and thus unite the door and panel thereabove in a way that said parts can be moved in unison. In turning the arm 32 in either direction, it is apparent that the arm of the spring with which the pivoted end of the arm contacts, will yield sufficiently to permit pivotal movement of said arm until it lies within the slot therefor, when it is obvious that the two arms of the said spring will co-act with the locking arm 32 so as to prevent its accidental movement. The enlargement 31 on the arm 32 is provided with a grooved portion 38 to enable it to be engaged by the finger or an instrument inserted in the extension of the enlarged portion 30 of the slot 29 for the purpose of turning the locking arm on its pivot.

Referring again to Figs. 1 and 2, it will be seen and understood that the canopy 12 is provided in its lower surface at each of its side edges, with a series of spaced recesses 39, each for the reception and operation of an extension 40 on each of the supporting arms 41 employed for slidable and pivotal connection with upright portions or rails of the main or master frame for a plurality of panels. Each of the arms 41 is pivotally mounted near one of its ends on a bracket 42 secured to the lower surface of the canopy at one side of each of the recesses therein. Each of these arms has extended from its pivoted portion a foot 43 which is adapted for engagement with a beveled portion 44 on the upper outer part of the top rail of the main or master frame 16 for the purpose of assisting in holding said frame and its panels in the elevated position shown by dotted lines in Fig. 2 of the drawings. The extension 40 of each lever has connected thereto one end of a spiral spring 45 the other end of which is connected to a part of the canopy at the lower end of the recess 39 therein. Each of the supporting arms 41 normally depends from its pivot and is pivotally connected at its lower end to a pair of apertured spaced lugs or ears 46 extended from a sleeve 47 which is slidably mounted on a bracket or rod 48 secured to one of the upright rails or portions of the main or master frame for the panels.

In order to prevent vibration of the sleeve 26 on the rod or bracket 48, each end of the sleeve 47 is reduced and screw-threaded to engage a cup-shaped nut 49 which loosely surround the rod or bracket and each of which has located therein a ring 50 of rubber or other suitable cushioning material to lie between the end of each reduced portion and the outer end of the nut thereon, by which means it is apparent the rattling of the parts will be prevented and noise eliminated.

In Fig. 1 I have shown by dotted lines three supporting arms 41 pivoted at their upper ends on the canopy as clearly shown in Fig. 2, but it is manifest that two such arms, one at the front end of the master frame and the other at the rear end thereof, may be all that is required. In order to assist in holding the master frame 16 and the panels or frames which it carries, in its elevated position as shown by dotted lines in Fig. 2, a catch member 51 pivoted at its upper portion to the lower surface of the canopy at about its longitudinal medial line, is employed to engage the inner edge of said frame or the corresponding edge of one of the panels thereof. This catch member 51 is provided near its upper end on one of its sides with an extension 52 between which and the canopy is located a spring 53 to actuate the member 51 in the direction of the master frame. To prevent the spring exerting too much tension on the extension 52 and thereby causing the catch member to be positioned in the path of the master frame an arm 54 extended from the opposite side of the member 51 from that on which the extension 52 is located, is employed to contact with the canopy and act as a stop for said catch member. Each of the sleeves 47 is by preference provided with a longitudinal slot 55 located between its lugs 46 to permit of sufficient resiliency to allow the lugs to be clamped more or less tightly on the lower end of the supporting arm 41 which is desirable in order to prevent too free pivotal movement of said arms.

In Fig. 7 is shown in vertical section a portion of the upper part of one of the doors 15 of the body and means for temporarily closing the slot in its upper end when the panel above the same is removed, which consists in employing a strip of rubber 56 having on its lower portion a cross-sectionally angular extension or enlargement 57, which enlargement can be forced into the slot 26, when it is desired to close the same and readily removed therefrom on account of the resiliency of the said strip.

As before stated, the lower horizontal rail 24 of each of the sashes or panels 19 and 21 is provided with a longitudinal slot 25 through which its pane 18 may pass downwardly into the cavity of the door beneath said panel. To enable each pane of each of said panels to be lowered without danger of breaking the same, a flexible member such as a ribbon or cord 58 of suitable material, is fixed at one of its ends in the slot of the rail 24 and is extended under the lower edge of the pane 18 and has its other end connected to a drum 59 mounted on the shaft of a crank handle 60, which shaft is journaled in the upper portion of one of the clamping strips 27 carried by the lower rail of the panel. By this arrangement it is apparent that by turning the crank handle 60 in the proper direction, the pane 18 can be raised or lowered as desired and maintained in such position by the frictional action of the said shaft.

In Fig. 8 is shown a plan sectional view taken on line 8—8 of Fig. 1 of a part of the rear portion of the body 13 and the means for shiftably mounting a panel in said portion. As shown, the body 13 is provided with a rectangular opening 61 to the front wall of which is secured by means of hinges 62 the front upright 63 of a rectangular frame 64 to the rear upright 65 of which is hinged the rear upright of a sash frame or panel 66 which is provided with a pane of glass 67 fixed therein. This sash or panel is of a size to fit closely within the frame 64 and has pivotally secured to its lower rail one end of a link 70 the other end of which is pivotally secured to a sleeve 71 slidably mounted on a bracket rod 72 secured longitudinally on the lower rail of the frame 64 as is clearly shown in Fig. 8 of the drawings. The sleeve 71 is provided with a set screw 73 to engage the rod 72 so as to fix said sleeve on said rod at any desired point. The lower rail of the frame 64 has pivotally secured thereto near its rear end another link 74, the other end of which link is pivotally secured to a sleeve 71 slidably mounted on a bracket rod 72 longitudinally secured to the inner surface of the body 13 at the lower horizontal wall of the opening 61 therein. The last named sleeve 71 is equipped with a set screw 73 for the same purpose as just above explained. By this arrangement it is manifest that the parts of the shiftable closure may be disposed in the positions shown in Fig. 8, when it is obvious that ventilation through the front part as well as the rear part thereof, will be attained. If it is desired to close the sash or panel 66 while the frame 64 is in the position shown in said figure, it is manifest that by sliding the sleeve 71 on the rod 72 at the front portion of the frame 64, the said sash or panel will be positioned so as to close the opening in the frame 64, in which position the sash or panel can be maintained by tightening the set screw 73 on the last named rod. The manner of closing the opening 61 is so obvious from the drawing as to require no explanation.

From the foregoing and by reference to the drawings, it will be readily understood that assuming the master panel or frame 16 and the plurality of panels or frames which it carries to be in the positions shown in Figs. 1 and 2 by continuous lines, and it being desired to open the front portion of the body, it is only necessary to press the upper portion of the master frame 16 outwardly until it is disengaged from the walls of the opening 14, especially at the top and bottom thereof, which operation will be permitted by reason of the pivotal connection at the lower ends of the supporting arms 41 with the sleeves 47 on the master frame. Now, by lifting the said frame slightly and turning its front portion further outwardly, it is apparent that it can be slid still further outwardly of the body on the bracket rods 48 to an extent as not to materially interfere with the occupants of the automobile, after which the master frame and its panels can be elevated to the position shown by dotted lines in Fig. 2, in which position the foot 43 on each of the rods 41 will engage the beveled portion 44 of the master frame so as to prevent lateral movement outwardly thereof, and it is obvious that the catch member 51 will engage and support the inner end of said frame.

In order to close the front portion of the top, it is only necessary to disengage the catch member from the frame 16, when by lowering said frame and reversing the operation thereof just above described, it is manifest that it can be placed vertically in the opening 14 of the wall of the vehicle, when the strips 27 will embrace the upper portion of the door under each of the hinged panels and the upper part of the frame 16 will rest against a stop strip 74 horizontally secured to the inner surface of the side edge of the canopy. When the parts are thus positioned, it is manifest that either of the doors 15 may be turned on its hinges to an open position and that, as they are detachably connected to the panel or frame directly above each, the frame or panel 19 or 21 will also be turned to an open position.

Having thus fully described my invention, what I claim as new and desire to secure by Letters Patent is:

1. In a vehicle body and top therefor having a wall provided with an elongated opening, the combination with a master frame fitting in and shiftably operable for inward and outward movements with respect to said opening, a hinged panel in said frame, supporting means for said master frame comprising an elongated member mounted at one of its ends on the top for pivotal movement and having at said end an extension to engage the upper portion of the master frame after the latter has been raised to a substantially horizontal position and pivotally connected at its other end to the master frame.

2. In a vehicle body and top therefor having a wall provided with door-ways and a horizontally elongated opening above said door-ways but in communication therewith, the combination with hinged doors to close said ways, of a master frame fitting in and shiftably operable for inward and outward movements with respect to said opening and having a plurality of panels, a hinged frame in each of said panels, supporting means for said master frame comprising a plurality of depending arms mounted at their upper ends on said top for lateral pivotal movement, and means pivotally connecting the lower ends of said arms to said master frame.

3. In a vehicle body and top therefor having a wall provided with door-ways and a horizontally elongated opening above said door-ways but in communication therewith, the combination with doors each hinged at one of its sides to close said ways, of a master frame fitting in and shiftably operable for inward and outward movements with respect to said opening and having a plurality of panels, frames hinged at one of their sides in some of said panels, supporting means for said master frame comprising a plurality of depending arms mounted at their upper ends on said top for lateral pivotal movement, and means pivotally and slidably connecting the lower ends of said arms to said master frame.

4. In a vehicle body and top therefor having a wall provided with a horizontally elongated opening, the combination with a master frame fitting in and shiftably operable for inward and outward movements with respect to said opening and having a plurality of panels located side by side, frames hinged at one of their sides in some of said panels, supporting means for said master frame comprising a plurality of depending arms mounted at their upper ends on said top for lateral pivotal movement, each of said arms having a foot extended from the pivoted portion of the arm for the purpose of engaging the upper portion of the master frame after the latter has been raised to a substantially horizontal position, and means pivotally and slidably connecting the lower ends of said arms to said master frame.

5. In a vehicle body and top therefor having a wall provided with door-ways and a horizontally elongated opening above said door-ways but in communication therewith, the combination with doors each hinged at one of its sides to close said ways, of a master frame fitting and shiftably operable in said opening and having a plurality of panels, some of which are open at their lower ends, a frame hinged at one of its sides in each of the panels having the said open ends, supporting means for said master frame comprising a plurality of depending arms mounted at their upper ends on said top for lateral pivotal movement, and each provided with a foot extended downwardly and outwardly from its pivoted portion and adapted for engagement with the upper portion of the master frame when the same is shifted to a substantially horizontal position, means pivotally and slidably connecting the lower ends of said arms to said master frame, and a spring-actuated catch member mounted on the canopy of the top to engage one end of the master frame when raised.

6. In a vehicle body and top therefor having a wall provided with door-ways and a horizontally elongated opening above said door-ways but in communication therewith, the combination with doors each hinged at one of its sides to close said ways, each of said doors having a cavity open through the upper end thereof, of a master frame fitting and shiftably operable in said opening and having a plurality of panels, each of the panels above each door being open at its lower end, a frame hinged at one of its sides in each of the panels having the said open ends, each of said hinged frames having a slot through its lower horizontal rail and provided with a pane of glass mounted for slidable movement through said slot into the cavity of the door thereunder, supporting means for said master frame comprising a plurality of depending arms mounted at their upper ends on said top for lateral pivotal movement and each provided with a foot extended downwardly and outwardly from its pivoted portion and adapted for engagement with the adjacent portion of the master frame when the same is shifted to a substantially horizontal position, means slidably and pivotally connecting the lower end of each of said arms to said master frame, and means on the canopy of the top to automatically engage the adjacent portion of the master frame when the same is raised.

LEE W. V. WILMS.